(12) United States Patent
Lee et al.

(10) Patent No.: US 6,549,252 B1
(45) Date of Patent: Apr. 15, 2003

(54) REFLECTIVE LIQUID CRYSTAL DISPLAY DEVICE HAVING A TFT AS A SWITCHING ELEMENT AND METHOD FOR FABRICATING THE SAME

(75) Inventors: Sang Gul Lee, Seoul (KR); Jong Hoon Yi, Seoul (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/461,209

(22) Filed: Dec. 15, 1999

(30) Foreign Application Priority Data

Dec. 15, 1998 (KR) ........................... 1998-55053

(51) Int. Cl.[7] ............................................. G02F 1/1335
(52) U.S. Cl. ......................... 349/47; 349/122; 349/113
(58) Field of Search ........................... 349/43, 47, 122, 349/138, 113; 257/59, 72; 438/30

(56) References Cited

U.S. PATENT DOCUMENTS

| 5,572,047 A | * | 11/1996 | Hiroki et al. ................. 257/72 |
| 5,610,741 A | | 3/1997 | Kimura |
| 5,729,308 A | * | 3/1998 | Yamazaki et al. ............ 349/43 |
| 5,763,899 A | * | 6/1998 | Yamazaki et al. ............ 257/59 |
| 6,011,275 A | * | 1/2000 | Ohtani et al. ................. 257/59 |
| 6,072,193 A | * | 6/2000 | Ohnuma et al. .............. 257/57 |
| 6,160,271 A | * | 12/2000 | Yamazaki et al. ............ 257/59 |
| 6,307,214 B1 | * | 10/2001 | Ohtani et al. ................. 257/50 |

* cited by examiner

Primary Examiner—Kenneth Parker
(74) Attorney, Agent, or Firm—Birch, Stewart, Kolasch & Birch, LLP

(57) ABSTRACT

The present invention is directed towards TFT-LCD devices and methods to manufacture the same. The devices of the present invention includes a gate electrode structure including an active layer and agate insulator, a protective layer formed over and along the sides of the gate electrode structure, contact layers formed on sides of the gate electrode structure and on a substrate, and source and drain electrodes on the contact layers.

45 Claims, 8 Drawing Sheets

REFLECTIVE LIQUID CRYSTAL DISPLAY DEVICE HAVING A TFT AS A SWITCHING ELEMENT AND METHOD FOR FABRICATING THE SAME

CROSS REFERENCE TO RELATED ART

This application claims the benefit of Korean Patent Application No. 1998-55053, filed on Dec. 15, 1998, which is hereby incorporated by reference.

BACKGROUND OF THE INVENTION

1. Field of the Invention

This invention relates to a liquid crystal display device, in particular to a liquid crystal display device having a TFT (thin film transistor) as a switching element and manufacturing method thereof.

2. Description of Conventional Art

A liquid crystal display (LCD) device employing a thin film transistor (TFT) as a switching element is typically called a thin film transistor-liquid crystal display (a TFT-LCD) device.

The semiconductor layer of the TFT is usually made of an amorphous silicon. But an amorphous silicon thin film transistor (a-Si:H TFT) has some disadvantages such as high cost and low reliability when compared with a cathode-ray tube (CRT). This is because the price of a drive circuit to operate the TFT is expensive and the amorphous silicon thin film transistor requires excessive amounts of lead lines to connect the outer drive circuit.

To solve these problems, employing polycrystalline silicon (hereinafter referred to simply as "Poly-Si") as a semiconductor layer of the switching element of TFT-LCD device has been suggested. Using Poly-Si, a thin film transistor and the drive circuit can be arranged on a same substrate, which enables the production of a TFT-LCD device without any additional processes to connect the pixel array substrate with the drive circuit as required in the reproduction of the amorphous silicon TFT-LCD device.

Below is a description about a conventional TFT-LCD device using Poly-Si as a semiconductor layer with reference to the drawings.

In general, a TFT-LCD is comprised of a lower back light, a TFT array substrate called a lower substrate and a color filter substrate called an upper substrate. FIGS. 1a to 1h illustrate the manufacturing process of the TFT array substrate according to a conventional art.

First, as shown in FIG. 1a, a source line 6 is formed on a substrate 1 using a first mask. A first metal layer is deposited using a sputter and patterned to form the source line 6. A metal such as chromium, molybdenum, aluminum, titanium, tin, tungsten or copper may be used for the first metal layer. An aluminum alloy is preferred due to its low resistance.

To prevent a hillock that may occur while the first metal layer is deposited as well as to prevent an open line that may occur while the first metal layer is patterned to form the source line 6, and then a second metal layer 8 is deposited and patterned using a second mask. Molybdenum (Mo) or moly-tungsten (MoW) is usually used for the second metal layer 8. (See FIG. 1b).

As shown in FIG. 1c, a first insulation film 10 is deposited as an interlayer insulator, which is formed for the insulation between the source line 6 and an active layer that will be formed later. Then, an amorphous silicon layer (a-Si:H) 12 is deposited to form the active layer.

The first insulation film 10 is formed by the atmospheric pressure chemical vapor deposition (APCVD), and the amorphous silicon layer 12 is formed by plasma enhanced chemical vapor deposition (PECVD).

After the deposition, the amorphous silicon layer 12 is subject to a dehydrogenation process to remove the hydrogen bound in it, then to a crystallization process to produce Poly-Si. The dehydrogenation is to inhibit the production of voids during the crystallization and also to improve the electric properties of the crystallized Poly-Si.

As shown in FIG. 1d, islands of active layer 14 are formed by patterning the Poly-Si using a third mask.

As shown in FIG. 1e, a second insulation film 16 and a third metal layer are deposited, respectively by PECVD and sputtering, on the entire surface. Then, gate electrodes 20 and 22 are formed by patterning the third metal layer using a fourth mask. Also, thereafter, the second insulation film 16 is dry-etched to half of its original thickness. The insulation film 16 is not fully etched to protect the polycrystalline silicon layer 14 later in the process.

Next, as shown in FIG. 1f, ion doping is performed to form source/drain regions 28 and 30 of the Poly-Si active layer 14, excluding the portions underlying the gate electrodes 20 and 22. Then, first and second protection layers 24 and 26 are deposited on the entire surface.

Thereafter, contact holes 28', 32 and 30' are formed by a fifth masking process, as shown in FIG. 1g.

As shown in FIG. 1h, transparent conductive material is deposited using a sixth mask to form a source electrode 38 and a drain/pixel electrode 40. The source electrode 38 connects the source line 6 and the source region 28 through the contact holes 32 and 28', and the drain/pixel electrode 40 contacts the drain region 30 through the contact hole 30'.

The conventional art described has the following disadvantages. First, the number of masks required is high leading to misalignment and low yield.

Second, because the source electrode 38 contacts the source line 6 through the contact hole 32, the contact resistance may increase due to residual matter of the insulation film 10 such as $SiO_2$, as a result of incomplete removal of the insulation film.

SUMMARY OF THE INVENTION

Accordingly, the present invention is directed to a TFT-LCD and a method for manufacturing the same that substantially obviates some or all of the problems due to the limitations and limitation related to the conventional art.

An object of this invention is to provide a TFT-LCD fabricated by four-mask process.

Another object of this invention is to provide a TFT-LCD in which the contact resistance by the contact between the source line and the source region of the active layer can be reduced.

A further object of this invention is to provide a TFT-LCD of low price by a simplified manufacture.

In order to achieve the objects, this invention provides, in one aspect, a reflective liquid crystal display device panel includes: a substrate; an insulation layer on the substrate; a semiconductor island on the insulation layer, having source and drain regions and a channel region disposed between the source and drain regions; a gate electrode over the channel region of the semiconductor island; a gate insulation layer between the gate electrode and the channel region of the semiconductor island; a protection layer covering the gate electrode and portions of the source and drain regions, the portions being adjacent to the channel region of the semiconductor island; an ohmic contact layer spaced from the protection layer and formed on the source and drain regions of the semiconductor island; source and drain electrodes formed on the ohmic contact layer, respectively, electrically contacting the source and drain regions of the semiconductor island; and a reflective electrode integrally formed with the drain electrode.

In another aspect, the present invention also provides a reflective liquid crystal display device panel includes: a substrate; an insulation layer on the substrate; a semiconductor island on the insulation layer, having a channel region, first regions adjacent to the channel region, and second regions adjacent to the first regions and positioned at either ends portion thereof; a gate electrode over the channel region of the semiconductor island; a gate insulation layer between the gate electrode and the channel region of the semiconductor island; a protection layer covering the gate electrode and the first regions of the semiconductor island; source and drain electrodes overlapping the second regions of the semiconductor island; and a reflective electrode integrally formed with the drain electrode, wherein the second regions has a lower doped density than the first regions of the semiconductor layer.

The present invention further contemplates a method for fabricating a reflective liquid crystal display device panel, includes the steps of: providing a substrate; forming a buffer layer on an entire surface of the substrate; forming an active island of a semiconductor on the buffer layer; forming a gate insulation film and a gate electrode on the active island, both having a smaller width than that of the active island; forming a protection film covering the gate electrode and a portion of the active island around the gate electrode; and sequentially depositing an impurity layer and a second metal layer on the entire surface of the substrate and patterning them as overlapping the active island and having a gap with the protection film, thereby to form an ohmic contact layer, source and drain electrodes overlapping the ohmic contact layer and a reflective electrode extended from the drain electrode.

The present invention further contemplates a method for providing a substrate; forming a buffer layer on an entire surface of the substrate; forming an active island of a semiconductor on the buffer layer; forming a gate insulation film and a gate electrode on the active island, both having a smaller width than that of the active island; n-type ion implanting the active island using the gate electrode as a first ion stopper; forming a protection film covering the gate electrode and a portion of the active island around the gate electrode; p-type ion implanting the active island using the protection film as a second ion stopper, gases for the p-type ion implantation having a lower ion density than those for the n-type ion implantation; and depositing a second metal layer on the entire surface of the substrate and patterning the second metal layer into forming source and drain electrodes overlapping the doped region of the active island and a reflective electrode extended from the drain electrode, the source and drain electrodes having a gap with the protection film.

The protection film is an organic insulation film made with a material selected from the group consisting of BCB (benzocyclobutene), acrylics and polyimide.

The semiconductor island is of polycrystalline silicon.

The reflective electrode has a plurality of bumps.

The present invention further includes a silicide layer on the ohmic contact layer.

The first and second regions of the semiconductor island have an n-type-doped composition.

The source and drain electrodes are spaced from the protection layer.

The present invention further includes a silicide process to form a silicide layer on the ohmic contact layer.

The silicide process includes an annealing process carried out at a temperature of about 200.

The active island is of polycrystalline silicon.

BRIEF DESCRIPTION OF THE DRAWINGS

For a more complete understanding of the invention and its advantages, reference is now made to the following descriptions taken in conjunction with the accompanying drawings, in which.

DETAILED DESCRIPTION OF PREFERRED EMBODIMENTS

The manufacture of a liquid crystal display, according to a preferred embodiment of the invention will be described with reference to FIG. 2, which is a plan view of one pixel of a polycrystalline silicon TFT-LCD of the invention, and FIGS. 3a to 3d, which are processing diagrams illustrating a cross-section through the line III–III' of the FIG. 2.

Figure 1A:
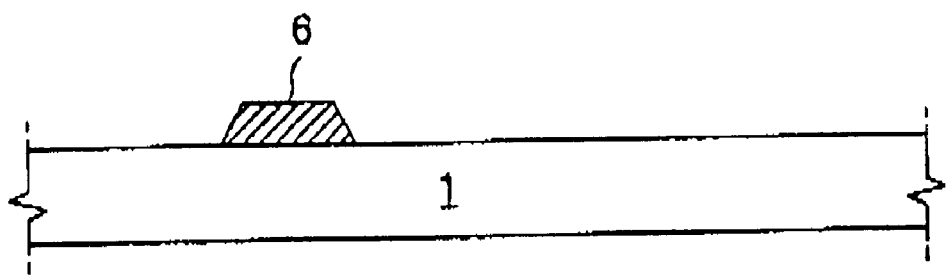
FIGS. 1a to 1h are processing diagrams illustrating the manufacture of a conventional TFT-LCD using polycrystalline silicon.
Figure 1B:
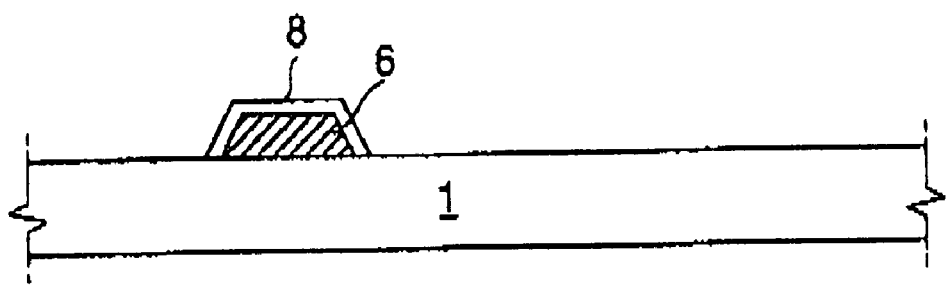
Figure 1C:
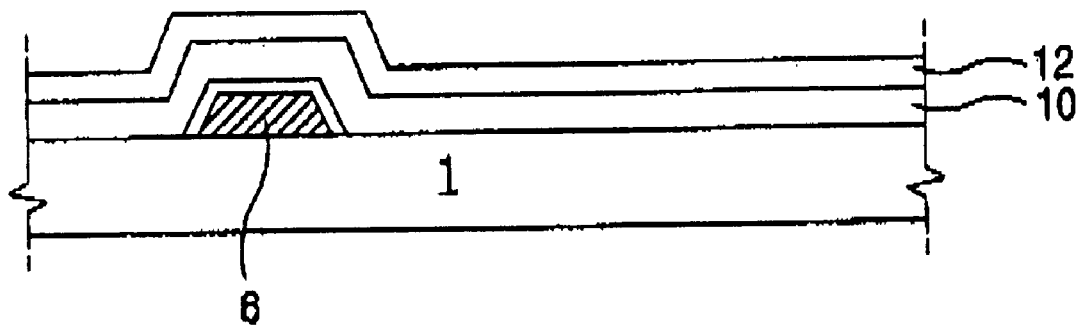
Figure 1D:
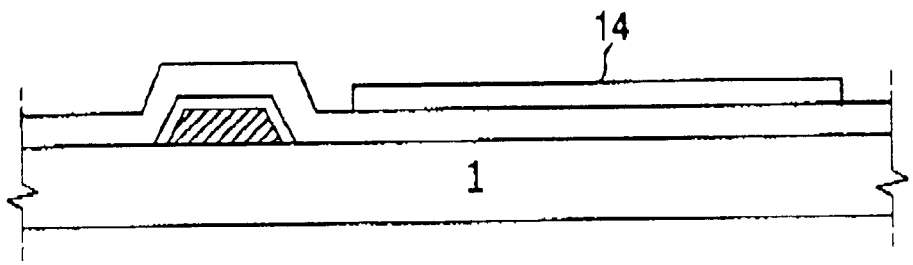
Figure 1E:
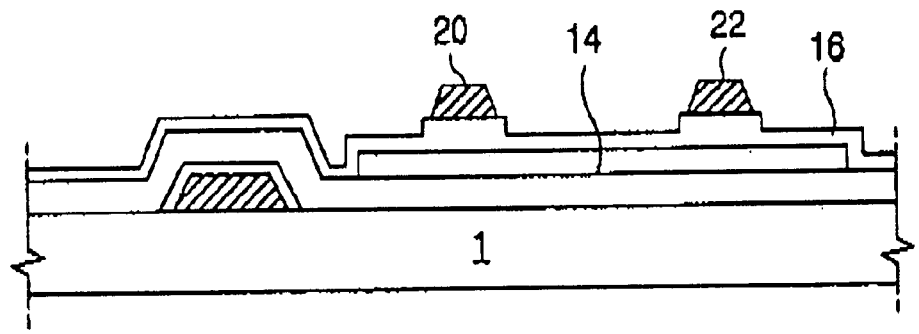
Figure 1F:
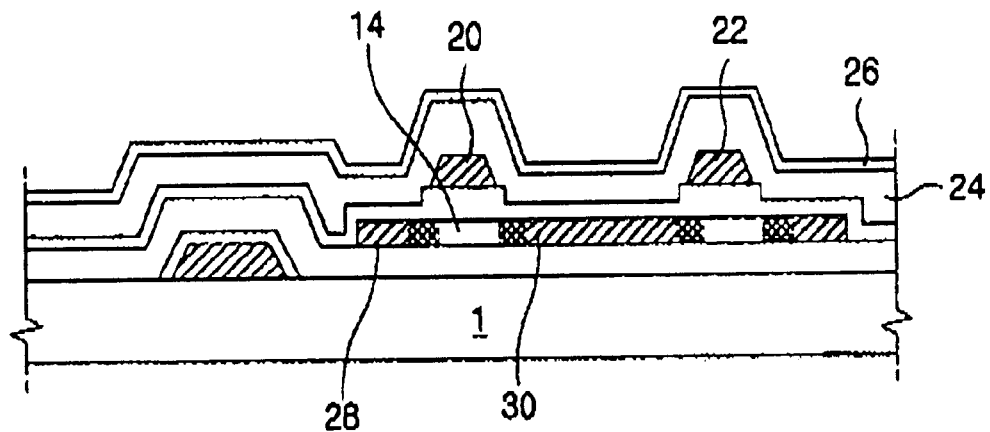
Figure 1G:
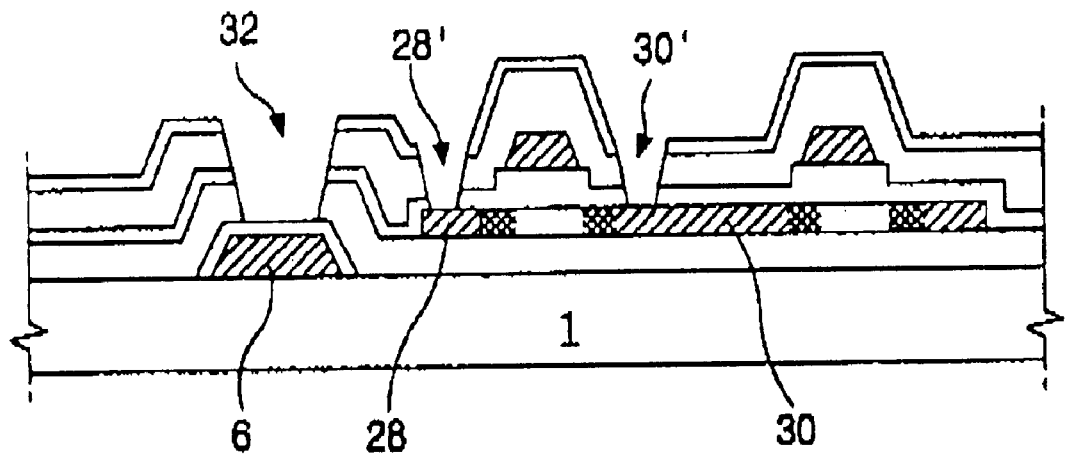
Figure 1H:
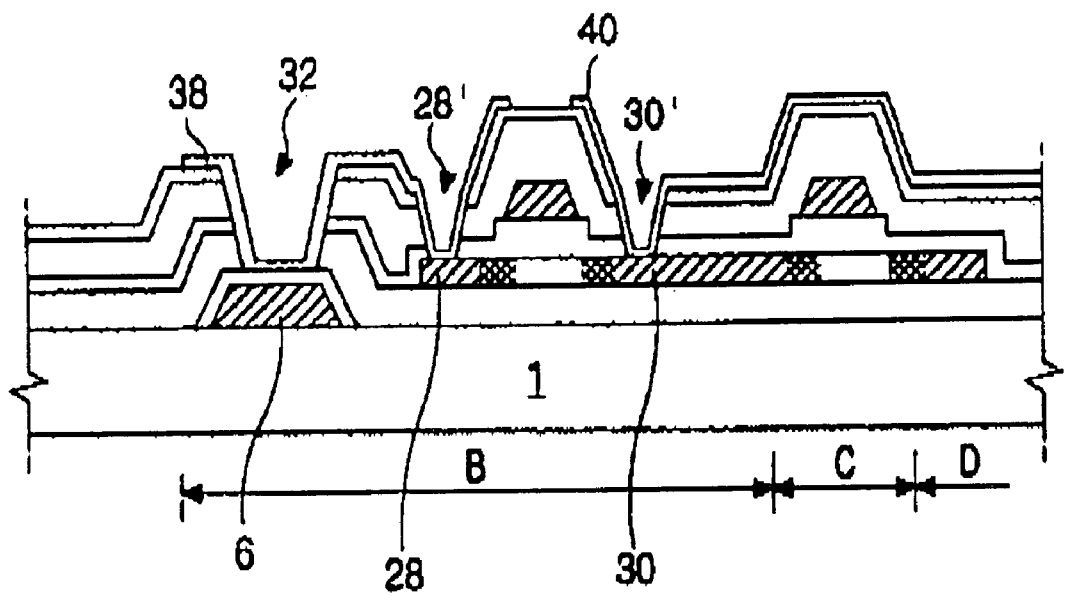
Figure 2:
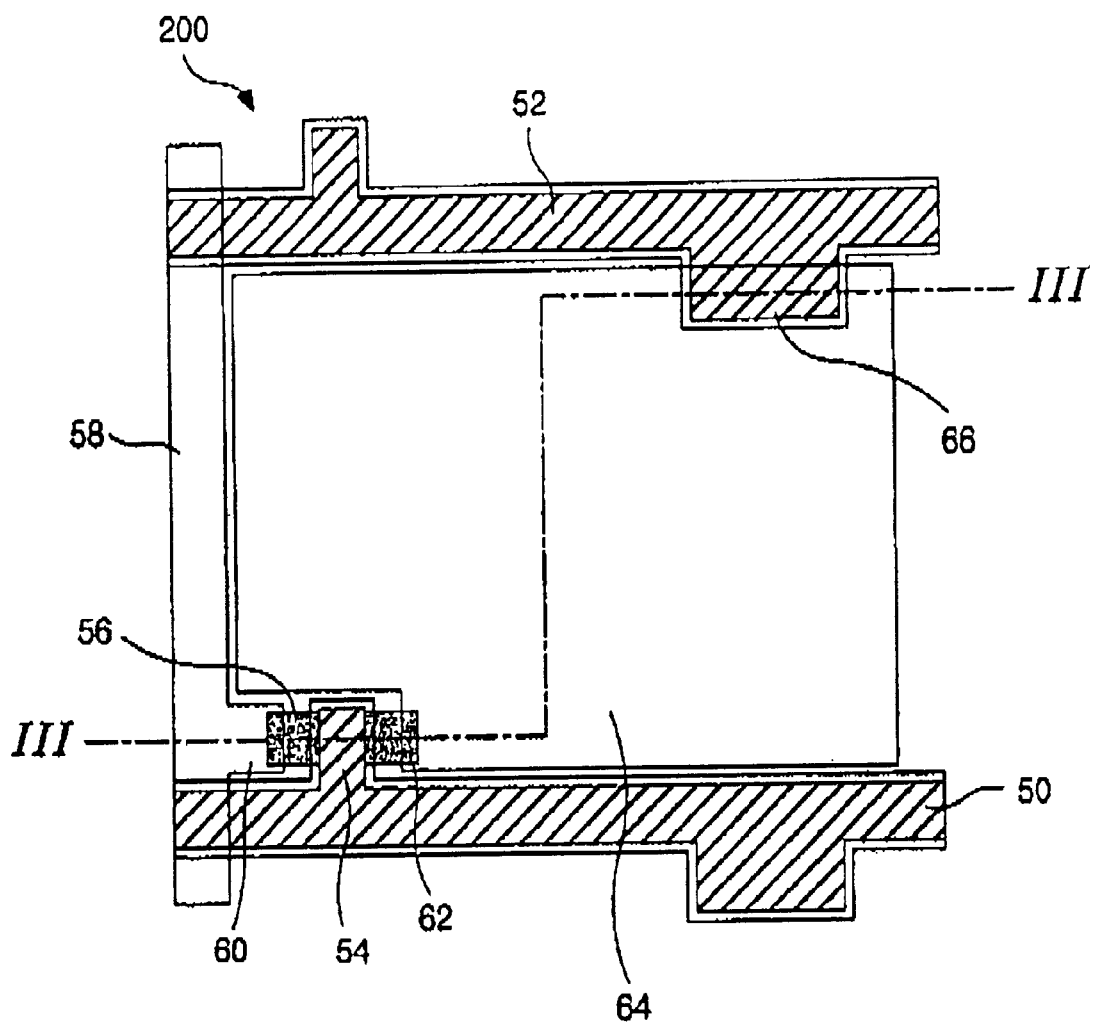
FIG. 2 is a plan view of one pixel of a reflective liquid crystal display fabricated according to one embodiment of the invention.

As shown in FIG. 2, Nth and N+1th gate lines 50 and 52 are disposed in row direction and a source line 58 is disposed in column direction. A gate electrode 54 is formed protruded from the Nth gate line 50, and a source electrode 60 is formed protruded from the data line 58. A pixel electrode 64 is formed and extended to form drain electrode 62 corresponding to the source electrode 60 in the pixel 200. Also, a capacitor electrode 66 is formed protruded from the N+1th gate line 52.

A polycrystalline silicon active layer 56 is formed under the gate electrode 54 and source and drain electrodes 60 and 62.

A TFT having such a structure that the gate electrode and source and drain electrodes are positioned over the active layer is generally called a coplanar type TFT.

For a more detailed explanation of the manufacturing processes, reference is now made to FIGS. 3a to 3d.

Figure 3A:
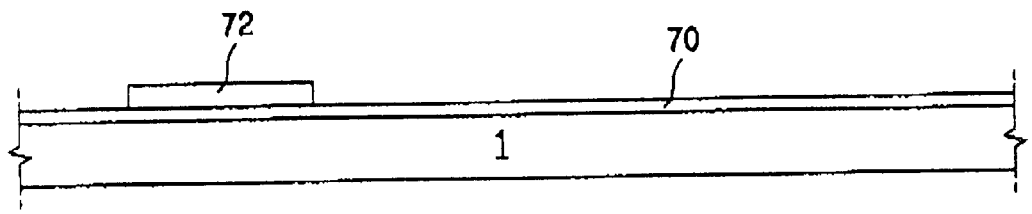
FIGS. 3a to 3d are processing diagrams illustrating in sequence a manufacture of the reflective LCD taken along line III–III' of FIG. 2.

First, as shown in FIG. 3a, a first insulation material 70 is directly deposited on a substrate 1. The first insulation material is also called a buffer layer or an under coat layer.

A non-alkaline glass substrate is used as the substrate 1. Because diffusion of alkaline ions from the substrate to an active layer deteriorates the properties of the thin film elements, a glass substrate used for the elements in the active matrix should contain a very low amount of alkaline materials.

Besides glass, a variety of insulation materials may be used for the substrate 1. One of them is a polymer, which is highly durable, resists heat well, is flexible, and is easily processed.

The insulation material 70 is usually a silicon dioxide film ($SiO_2$), for a sealant that will be adapted in the later process of the TFT-LCD may affect the alkaline materials contained in the substrate and adhesion of the seal may be lowered.

After the first insulation material 70 is deposited, an amorphous silicon (a-Si:H) is deposited. Then, a dehydrogenation is performed so that the hydrogen (H) contained in the amorphous silicon may be removed.

The dehydrogenation greatly affects the quality of the polycrystalline silicon film formed later. Unless the hydrogen in the amorphous silicon is removed, the electrical properties of the polycrystalline silicon film become undesirable due to formation of voids.

After the dehydrogenation, a crystallization process is performed to convert amorphous silicon to polycrystalline silicon. Methods for the crystallization include:

(1) excimer laser annealing crystallization (ELA) where amorphous silicon is grown to polycrystalline silicon by applying excimer laser while heating the substrate to about 250° C.; (2) metal induced crystallization (MIC) to form polycrystalline silicon by depositing a metal layer on the amorphous silicon; and (3) solid phase crystallization (SPC) to form polycrystalline silicon by heat treatment of the amorphous silicon at a high temperature for a long time. Also, polycrystalline silicon may be directly deposited.

The solid phase crystallization takes a long time to process at a high temperature, and requires a high-cost quartz substrate. However, the quality of the film obtained is excellent. The laser annealing method uses a low-cost glass substrate and is the subject of many research projects.

After crystallization of the amorphous silicon, a first mask pattern is used to form an island type active layer 72 of Poly-Si.

A Poly-Si thin film is a silicon film in which the crystal region and the amorphous region exist together. When the Poly-Si thin film is used in a TFT, electric field effect mobility of the TFT is about 100 to 200 times as high as that of the TFT employing an amorphous silicon thin film. This electric field effect mobility increases as the crystal region in a Poly-Si thin film, i.e. the size of the crystal, gets larger. Higher electric field effect mobility also can be obtained by forming uniform sized crystals, leading to decrease of the amorphous regions.

Figure 3B:
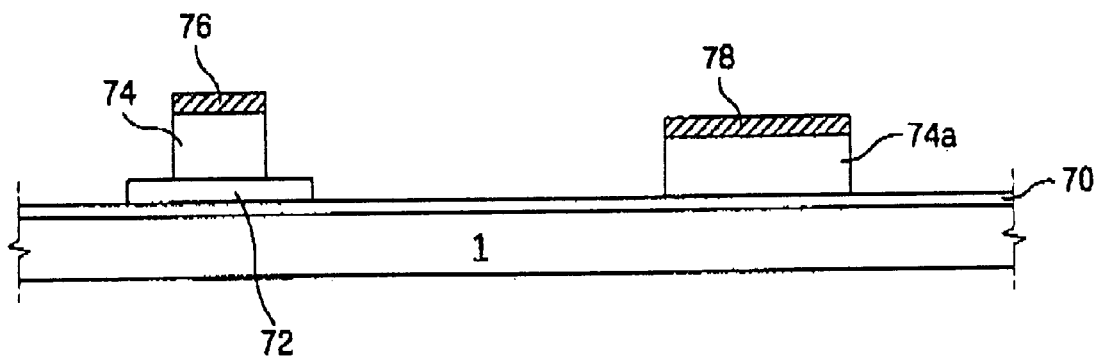

Thereafter, as shown in FIG. 3b, an insulation material and a first metal layer are deposited in succession. A second mask is used to pattern them to form a gate insulation film 74 and gate electrode 76, both being smaller in width than the active layer 72. At the same time, a capacitor electrode 78 of the first metal layer on the capacitor insulation film 74a is formed on a predetermined position of the substrate 1.

Figure 3C:
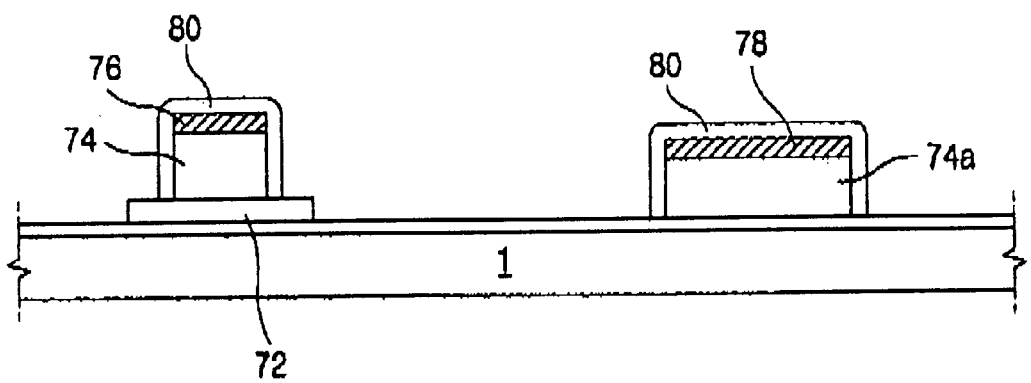

Then, a protection film 80 is deposited and patterned on the gate electrode 76 and the capacitor electrode 78 using a third mask, as illustrated in FIG. 3c.

Figure 4A:
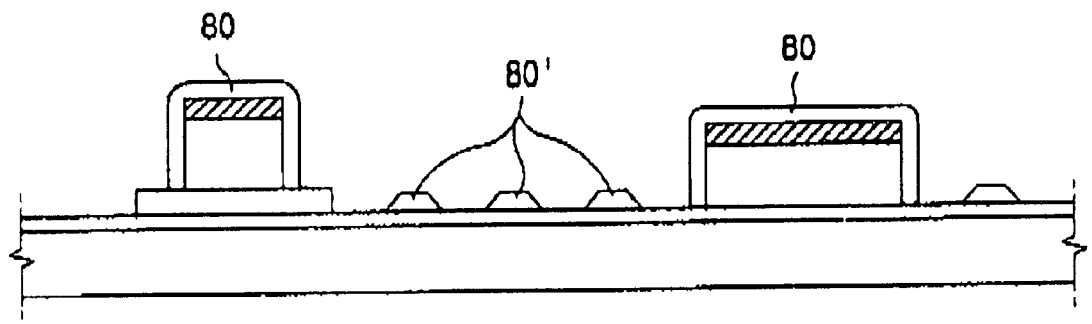
FIGS. 4a and 4b are processing diagrams illustrating a modified embodiment of FIGS. 3c and 3d.

At this point, the process as exemplified by FIG. 3c can be modified as shown in FIG. 4a. In FIG. 4a, a plurality of bumps 80' are formed in a pixel part where a pixel electrode will be formed. The plurality of bumps 80' maybe made of the same material as the protection film 80. The reason for the modification is the following.

At this point, the process as exemplified by FIG. 3c can be modified as shown in FIG. 4a. In FIG. 4a, a plurality of bumps 80' are formed in a pixel part where a pixel electrode will be formed. The plurality of bumps 80' may be made of the same material as the protection film 80. The reason for the modification is described below.

A general reflective TFT-LCD has no back light device and thus uses ambient light as a light source to produce images. Accordingly, a reflective plate or a pixel electrode of a highly reflective metal is placed in the lower part of the TFT array substrate to reflect the light source. But in these methods, the TFT-LCD itself functions as a mirror, which causes images to deteriorate. U.S. Pat. No. 5,610,741 discloses that bumpy surfaces of the reflective plates help to reflect the light incident from all angles in a direction almost vertical to the surface of the display screen and thus obtain a bright display image.

To form protection film 80 and bumps 80', inorganics such as silicon dioxide ($SiO_2$) and silicon nitride ($SiN_x$) or organics such as BCB (benzocyclobutene), polyimide and acrylic compound may be used. Organic insulation film is preferred over the inorganic film.

Figure 3D:
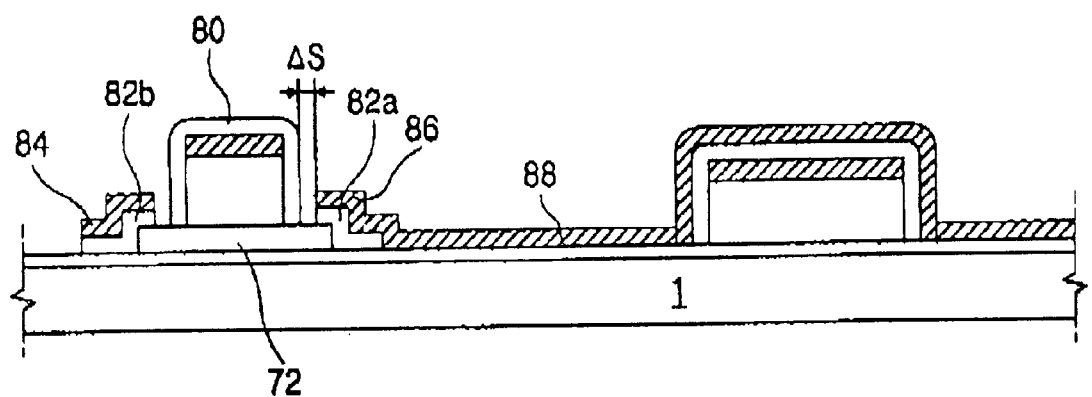
Figure 4B:
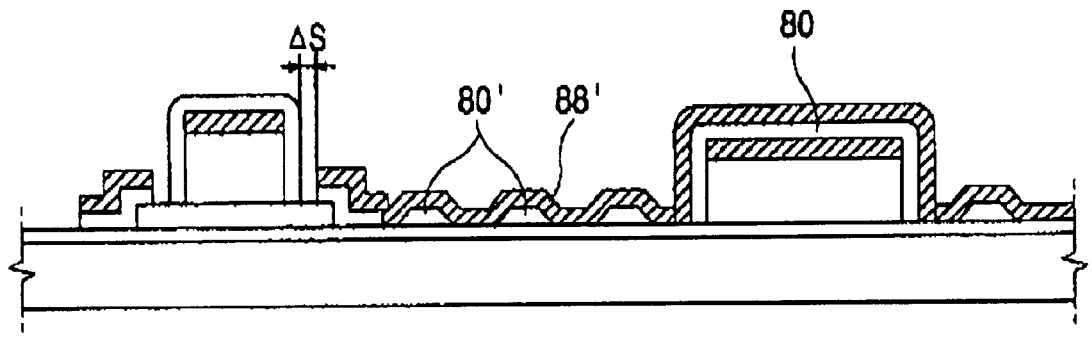

As shown in FIGS. 3d and 4b, the next process is to form a doped layer 82a and 82b as an ohmic contact of the subsequently formed electrodes and the active layer 72. A plasma enhanced chemical vapor deposition (PECED) or an ion shower method can be employed for the formation of the doped layers.

The doped layer is formed by depositing amorphous silicon and adding trace amounts of boron B of Group III ($B_2H_6$) or phosphorus P of Group V ($PH_3$) (formulas in the parentheses are the doping gases). Doped layer added with B will operate as a p-type semiconductor and one added with P will operate as an n-type semiconductor. In addition to B and P, many other dopants can be used.

After the doped layer is deposited, a second metal layer is deposited and patterned through a fourth mask to form source and drain electrodes 84 and 86 and a pixel electrode 88. The source and drain electrodes 84 and 86 are formed with an interval of $\Delta S$ from the protection film 80 of the gate electrode 76. The interval $\Delta S$ provides an alignment margin for error during the photolithography process to help prevent the formation of a parasitic capacitor between the gate electrode 76 and the source/drain electrodes 84 and 86.

The pixel electrode 88 extends over the capacitor electrode 78 to form a storage capacitor. In the reflective TFT-LCD of the invention, the pixel electrode 88 also functions as a reflective plate or reflective electrode as shown in FIG. 3d.

At this time, if a plurality of bumps 80' are formed with the protection film 80 as shown in FIG. 4a, the pixel electrode 88' also covers the bumps 80' as shown in FIG. 4b.

Then, the doped layer is etched out except for portions beneath the source and drain electrodes 84 and 86 using the source and drain electrodes 84 and 86 as a mask, to form the ohmic contact layers 82a and 82b, respectively.

A silicide process is performed to complete the manufacturing of a thin film transistor array panel of a TFT-LCD, as is illustrated in FIGS. 3d and 4b. The TFT array panel and a color filter panel are combined together with a gap in between, and a liquid crystal is injected between them to construct a reflective TFT-LCD.

The silicide is an alloy of a metal with silicon and has a low resistance, which translates to a low signal loss. The silicide process according to the embodiment involves annealing at about 200° C. to form the silicide ($M_2Si$; M means a metal for source/drain electrodes) at an interface between the source and drain electrodes 84 and 86 and the doped layers 82a and 82b, respectively.

In the foregoing preferred embodiment, the doped layer is formed on the active layer 72, but a lightly doped drain (LDD) method may be employed using ion implantation, which is described below.

Figure 5A:
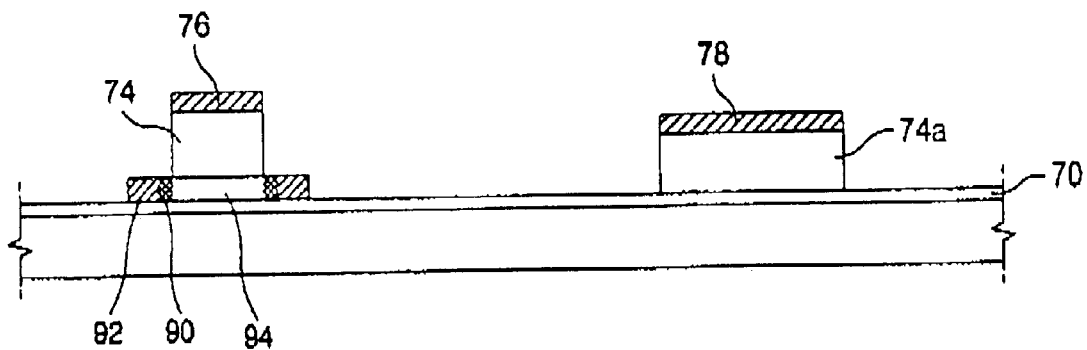
FIGS. 5a and 5b are processing diagrams illustrating another embodiment of the invention.
Figure 5B:
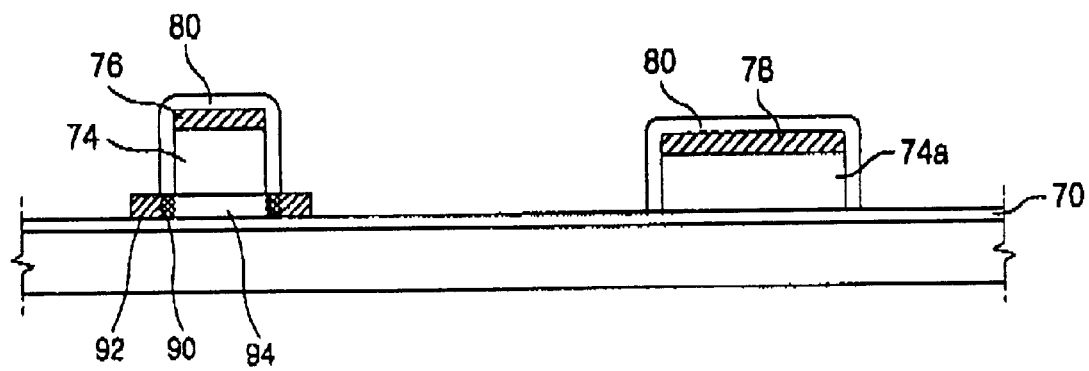

FIGS. 5a and 5b are processing diagrams illustrating another embodiment of the invention.

In FIG. 5a, the active layer 72 has a channel region 94 under the gate electrode 76, first regions 90 adjacent to the channel region 94 and second regions 92 at either ends thereof. The first and second regions 90 and 92 are ion-implanted by n-type gases using the gate electrode 76 as an ion stopper, thus n-type doped regions are formed.

As shown in FIG. 5b, the protection film 80 is formed. Second regions 92 that are substantially source and drain regions are ion-implanted, this time by p-type gases using the protection film 80 as the ion stopper. The p-type gas has a lower density than the n-type gas. Therefore, the second regions 92 have the same conductivity-type, i.e. n-type, as the first regions 90, but the densities of the doped gas of the first and second regions 90 and 92 are different from each other. Since the second regions 92 have a lower doped density than the first region 90, a hot-carrier effect can be reduced on the drain region.

The later processes are substantially same as described previously in FIG. 3d, and thus are omitted.

The embodiments of the present invention has the following advantages.

The application of a switching element of offset structure decreases the parasitic capacitance that may occur between source/drain electrodes and a gate electrode, so that a TFT-LCD with a stable image display can be manufactured.

The manufacture process is simplified, because no contact hole is needed.

The formation of silicide reduces contact resistance and accordingly a decrease in signal delay, which in turn leads to clearer images.

Although preferred embodiments and advantages of the invention has been described, variations and changes thereof will be apparent to the skilled in the art. Therefore, the preferred embodiments are not given with the intention to restrict the present invention, the spirit and scope of which will be defined by the following claims.

What is claimed is:

1. A reflective liquid crystal display device panel, comprising:
    a substrate;
    an insulation layer on the substrate;
    a semiconductor island on the insulation layer, having source and drain regions and a channel region disposed between the source and drain regions;
    a gate electrode over the channel region of the semiconductor island;
    a gate line connected to the gate electrode;
    a gate insulation layer between the gate electrode and the channel region of the semiconductor island;
    a protection film covering the gate electrode and portions of the source and drain regions, the portions being adjacent to the channel region of the semiconductor island;
    an ohmic contact layer spaced a predetermined distance from the protection film and formed on the source and drain regions of the semiconductor island;
    source and drain electrodes formed on the ohmic contact layer, respectively, electrically contacting the source and drain regions of the semiconductor island;
    a data line connected to the source electrode, the date line defining a pixel region with the gate line; and
    a reflective electrode integrally formed with the drain electrode, the reflective electrode being formed by extending the drain electrode to the pixel region.

2. The reflective liquid crystal display device panel of claim 1, wherein the protection film is an organic insulation film made with a material selected from the group consisting of BCB (benzocyclobutene), acrylics and polyimide.

3. The reflective liquid crystal display device panel of claim 1, wherein the semiconductor island is of polycrystalline silicon.

4. The reflective liquid crystal display device panel of claim 1, wherein the reflective electrode has a plurality of bumps.

5. The reflective liquid crystal display device panel of claim 1, further comprising a silicide layer on the ohmic contact layer.

6. A reflective liquid crystal display device panel, comprising:
    a substrate;
    an insulation layer on the substrate;
    a semiconductor island on the insulation layer, having a channel region, first regions adjacent to the channel region, and second regions adjacent to the first regions and positioned at either ends portion thereof wherein the second regions has a lower doped density than the first regions of the semiconductor layer;
    a gate electrode over the channel region of the semiconductor island;
    a gate line connected to the gate electrode;
    a gate insulation layer between the gate electrode and the channel region of the semiconductor island;
    a protection film covering the gate electrode and the first regions of the semiconductor island;
    source and drain electrodes overlapping the second regions of the semiconductor island;
    a data line connected to the source electrode, the date line defining a pixel region with the gate line; and
    a reflective electrode integrally formed with the drain electrode, the reflective electrode being formed by extending the drain electrode to the pixel region.

7. The device of claim 6, wherein the first and second regions of the semiconductor island has an n-type-doped composition.

8. The device of claim 6, wherein the source and drain electrodes are spaced a predetermined distance from the protection layer.

9. A method for fabricating a reflective liquid crystal display device panel, comprising the steps of:
    providing a substrate;
    forming a buffer layer on an entire surface of the substrate;
    forming an active island of a semiconductor on the buffer layer;
    forming a gate insulation film and a gate electrode on the active island, both having a sampler width than that of the active island;
    providing a gate line connected to the gate electrode;
    forming a protection film covering the gate electrode and a portion of the active island around the gate electrode;
    sequentially depositing an impurity layer and a second metal layer on the entire surface of the substrate and patterning them as overlapping the active island and having a gap with the protection film, thereby to form an ohmic contact layer, source and drain electrodes overlapping the ohmic contact layer and a reflective electrode extended from the drain electrode; and providing a date line connected to the source electrode, the date line defining a pixel region with the gate line, said reflective electrode being formed by extending the drain electrode to the pixel region.

10. The method of claim 9, wherein the active island is of polycrystalline silicon.

11. The method of claim 9, wherein the protection film is an organic insulation film.

12. The method of claim 11, wherein the organic insulation film is made of a material selected from the group consisting of BCB (benzocyclobutene), acrylics and polyimide.

13. The method of claim 9, further comprising a suicide process to form a silicide layer on the ohmic contact layer.

14. The method of claim 13, wherein the silicide process includes an annealing process carried out at a temperature of about 200° C.

15. A method for fabricating a reflective liquid crystal display device panel, comprising the steps of:

providing a substrate;

forming a buffer layer on an entire surface of the substrate;

forming an active island of a semiconductor on the buffer layer;

forming a gate insulation film and a gate electrode on the active island, both having a smaller width than that of the active island;

n-type ion implanting the active island using the gate electrode as a first ion stopper;

forming a protection film covering the gate electrode and a portion of the active island around the gate electrode;

p-type ion implanting the active island using the protection film as a second ion stopper, gases for the p-type ion implantation having a lower ion density than those for the n-type ion implantation; and depositing a second metal layer on the entire surface of the substrate and patterning the second metal layer into forming source and drain electrodes overlapping the doped region of the active island and a reflective electrode extended from the drain electrode, the source and drain electrodes having a gap with the protection film.

16. The method of claim 15, wherein the active island is of polycrystalline silicon.

17. The method of claim 15, wherein the protection film is an organic insulation film.

18. The method of claim 17, wherein the organic insulation film is made of a material selected from the group consisting of BCB (benzocyclobutene), acrylics and polyimide.

19. The method of claim 15, further comprising a silicide process to form a silicide layer on the ohmic contact layer.

20. The method of claim 19, wherein the silicide process including an annealing process carried out at a temperature of about 200° C.

21. An TFT-LCD panel, comprising:

a substrate;

an insulator formed on said substrate;

an active layer formed on a portion of said insulator;

a gate insulator formed on said active layer;

a gate electrode formed on said gate insulator;

a protective film formed over and along sides of said gate electrode and said gate insulator;

contact layers formed on said insulator and on and either side of said active layer, the contact layers contacting substantially the entire surface of either side of said active layer; and source and drain electrodes on said contact layers.

22. The device of claim 21, wherein said source and drain electrodes are separated from said protective film by a predetermined distance.

23. The device of claim 21, further comprising a plurality of reflective bumps on a pixel part of said insulator.

24. The device of claim 21, further comprising:

a capacitor insulator formed on said insulator;

a capacitor electrode formed on said gate insulator;

said protective film also formed over and along sides of said capacitor electrode and said capacitor insulator; and a pixel electrode formed over a pixel part of said insulator and over said protective film.

25. The device of claim 24, further comprising a plurality of reflective bumps on said pixel part of said insulator and below said pixel electrode.

26. The device of claim 21, wherein said active layer includes:

a channel region substantially below said gate insulator;

a first region adjacent to said channel region on either side of said channel region; and a second region adjacent to said first region and opposite said channel region.

27. The device of claim 26, wherein doped concentrations of said first and second regions are different.

28. The device of claim 27, wherein the doped concentration of said first region is higher than the doped concentration of said second region.

29. A method to produce a TFT-LCD device, comprising:

forming a insulator on a substrate;

forming an active layer on a portion of said insulator;

forming a gate insulator on said active layer;

forming a gate electrode on said gate insulator;

forming a protective film over and along sides of said gate electrode and said gate insulator;

forming contact layers on said insulator and on and either side of said active layer the contact layers contacting substantially the entire surface of either side of said active layer; and forming source and drain electrodes on said contact layers.

30. The method of claim 29, wherein said source and drain electrodes are separated from said protective film by a predetermined distance.

31. The method of claim 29, further comprising forming a plurality of reflective bumps on a pixel part of said insulator.

32. The method of claim 29, further comprising:

forming a capacitor insulator on said insulator;

forming a capacitor electrode on said gate insulator;

forming said protective film also over and along sides of said capacitor electrode and said capacitor insulator; and forming a pixel electrode over a pixel part of said insulator and over said protective film.

33. The method of claim 32, further comprising forming a plurality of reflective bumps on said pixel part of said insulator and below said pixel electrode.

34. The method of claim 29, further comprising:
defining a channel region substantially below said gate insulator;
defining a first region adjacent to said channel region on either side of said channel region; and
defining second region adjacent to said first region and opposite said channel region.

35. The device of claim 4, wherein doped concentrations of said first and second regions are different.

36. The device of claim 35, wherein the doped concentration of said first region is higher than the doped concentration of said second region.

37. A reflective liquid crystal display device panel, comprising:
a substrate;
an insulation layer on the substrate;
a semiconductor island on the insulation layer, having source and drain regions and a channel region disposed between the source and drain regions;
a gate electrode over the channel region of the semiconductor island;
a gate insulation layer between the gate electrode and the channel region of the semiconductor island;
a protection film covering the gate electrode and portions of the source and drain regions, the portions being adjacent to the channel region of the semiconductor island, wherein the protection film is an organic insulation film made with a material selected from the group consisting of BCB (benzocyclobutene), acrylics and polyimide;
an ohmic contact layer spaced a predetermined distance from the protection film and formed on the source and drain regions of the semiconductor island;
source and drain electrodes formed on the ohmic contact layer, respectively, electrically contacting the source and drain regions of the semiconductor island; and
a reflective electrode integrally formed with the drain electrode.

38. The reflective liquid crystal display device panel of claim 37, wherein the semiconductor island is of polycrystalline silicon.

39. The reflective liquid crystal display device panel of claim 37, wherein the reflective electrode has a plurality of bumps.

40. The reflective liquid crystal display device panel of claim 1, further comprising a silicide layer on the ohmic contact layer.

41. A method for fabricating a reflective liquid crystal display device panel, comprising the steps of:
providing a substrate;
forming a buffer layer on an entire surface of the substrate;
forming an active island of a semiconductor on the buffer layer;
forming a gate insulation film and a gate electrode on the active island, both having a smaller width than that of the active island;
forming a protection film covering the gate electrode and a portion of the active island around the gate electrode, said protection film being an organic insulation film;
sequentially depositing an impurity layer and a second metal layer on the entire surface of the substrate and patterning them as overlapping the active island and having a gap with the protection film, thereby to form an ohmic contact layer, source and drain electrodes overlapping the ohmic contact layer and a reflective electrode extended from the drain electrode.

42. The method of claim 41, wherein the active island is of polycrystalline silicon.

43. The method of claim 12, wherein the organic insulation film is made of a material selected from the group consisting of BCB (benzocyclobutene), acrylics and polyimide.

44. The method of claim 13, further comprising a silicide process to form a silicide layer on the ohmic contact layer.

45. The method of claim 44, further comprising a silicide process to form a silicide layer on the ohmic contact layer.

* * * * *